US012625549B2

(12) United States Patent
Kamimura

(10) Patent No.: US 12,625,549 B2
(45) Date of Patent: May 12, 2026

(54) DISPLAY CONTROLLING APPARATUS, DISPLAY CONTROLLING METHOD AND NON-TRANSITORY RECORDING MEDIUM

(71) Applicant: NEC Corporation, Tokyo (JP)

(72) Inventor: Junichi Kamimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/836,097

(22) PCT Filed: Feb. 14, 2022

(86) PCT No.: PCT/JP2022/005690
§ 371 (c)(1),
(2) Date: Aug. 6, 2024

(87) PCT Pub. No.: WO2023/152975
PCT Pub. Date: Aug. 17, 2023

(65) Prior Publication Data
US 2025/0117078 A1 Apr. 10, 2025

(51) Int. Cl.
*G06F 3/01* (2006.01)
*G06T 7/20* (2017.01)
*G06T 7/70* (2017.01)
(52) U.S. Cl.
CPC ............... *G06F 3/013* (2013.01); *G06T 7/20* (2013.01); *G06T 7/70* (2017.01); *G06T 2207/30201* (2013.01)
(58) Field of Classification Search
None
See application file for complete search history.

(56) References Cited

U.S. PATENT DOCUMENTS

| 10,591,576 B1* | 3/2020 | Tang | G07C 5/008 |
| 2004/0042644 A1 | 3/2004 | Yuasa et al. | |
| 2006/0204050 A1 | 9/2006 | Takizawa | |
| 2007/0211925 A1* | 9/2007 | Aoki | G06V 40/166 |
| | | | 382/118 |
| 2022/0245978 A1 | 8/2022 | Murata | |
| 2022/0392271 A1* | 12/2022 | Vossoughi | G07B 15/063 |

FOREIGN PATENT DOCUMENTS

| JP | 2000-259814 A | 9/2000 |
| JP | 2001-016573 A | 1/2001 |
| JP | 2003-331323 A | 11/2003 |
| JP | 2006-236244 A | 9/2006 |
| JP | 2007-241500 A | 9/2007 |
| JP | 2014-157634 A | 8/2014 |

(Continued)

OTHER PUBLICATIONS

JP Office Action for JP Application No. 2023-580045, mailed on May 27, 2025 with English Translation.

(Continued)

*Primary Examiner* — Nicholas J Lee

(57) ABSTRACT

It comprises a position estimating means 11 for estimating a position of an authenticated person from an image generated by imaging a predetermined space, and a display controlling means 12 for controlling display of authenticated person information I relating to the authenticated person in accordance with the position of the authenticated person.

20 Claims, 11 Drawing Sheets

(56)　　　　　References Cited

FOREIGN PATENT DOCUMENTS

| | | | |
|---|---|---|---|
| JP | 2014-219704 | A | 11/2014 |
| JP | 2018-017924 | A | 2/2018 |
| JP | 2018-195141 | A | 12/2018 |
| JP | 2021-036304 | A | 3/2021 |
| WO | 2021/156996 | A1 | 8/2021 |

OTHER PUBLICATIONS

International Search Report for PCT Application No. PCT/JP2022/005690, mailed on Apr. 19, 2022.

Nagata, Kohel et al. "Flight information system solutions for airports and initiatives for globalization". Mitsubishi Denki Giho. Aug. 20, 2016, vol. 90, No. 8, pp. 39-43, p. 40, non-official translation.

* cited by examiner

DISPLAY CONTROLLING APPARATUS, DISPLAY CONTROLLING METHOD AND NON-TRANSITORY RECORDING MEDIUM

This application is a National Stage Entry of PCT/JP2022/005690 filed on Feb. 14, 2022, the contents of all of which are incorporated herein by reference, in their entirety.

TECHNICAL FIELD

This disclosure relates to technical fields of a display controlling apparatus, a display controlling method and a recording medium.

BACKGROUND

It is described in a patent literature 1 that a technique generates a difference image from an image, in which a face of a person passing through a gate is imaged from diagonally downward, detects a change area from the generated difference image, then, performs normalization processing on the detected change area, generates input information from the normalized image, and performs classifying normalized patterns by calculating similarity with registered dictionary information. It is described in a patent literature 2 that a technique turns an optical axis of a camera into a passage line joining an edge of an inlet and an edge of an outlet, sets observation conditions of the camera such that an essential observation area Q, which is determined by a range A along a width direction, in which a face of a pedestrian can pass, in a visual field of the camera, and a range B along a length direction, in which the face can move while an image for observation is acquired, is included in an observable area P of the camera, acquires an image which allows stable extracting features of the face of the pedestrian, and accurately observes the face of the pedestrian. It is described in a patent literature 3 that a technique images an image including at least a face of a pedestrian by a camera while the pedestrian presents from a C point to an A point in a travelling zone, determines whether or not the pedestrian is a person registered in advance by using an acquired image while the pedestrian M arrives a door from the A point, and unlocks the door when it is determined that the pedestrian is the person registered. It is described in a patent literature 4 that a technique images a person passing through a passageway leading to a gate, acquires a detection result from a detecting part disposed on a surface of the passageway, and controls an imaging timing by using the acquired detection result.

CITATION LIST

Patent Literature

Patent Literature 1: Japanese Patent Application Laid Open No. 2000-259814

Patent Literature 2: Japanese Patent Application Laid Open No. 2001-016573

Patent Literature 3: Japanese Patent Application Laid Open No. 2006-236244

Patent Literature 4: International Publication No. 2021/156996

SUMMARY

Technical Problem

This disclosure is to provide a display controlling apparatus, a display controlling method and a recording medium aiming to improve techniques described in the prior art literatures.

Solution to Problem

One aspect of a display controlling apparatus comprises: a position estimating means for estimating a position of an authenticated person from an image generated by imaging a predetermined space, and a display controlling means for controlling display of authenticated person information relating to the authenticated person, in accordance with the position of the authenticated person.

One aspect of a display controlling method includes: estimating a position of an authenticated person from an image generated by imaging a predetermined space, and controlling display of authenticated person information relating to the authenticated person, in accordance with position of the authenticated person.

One aspect of a recording medium, on which a computer program is recorded, wherein the computer program makes a computer perform a display controlling method including: estimating a position of an authenticated person from an image generated by imaging a predetermined space, and controlling display of authenticated person information relating to the authenticated person, in accordance with the position of the authenticated person.

DESCRIPTION OF EMBODIMENTS

Embodiments of a display controlling apparatus, a display controlling method and a recording medium are described hereinafter with referring to figures.

1: First Embodiment

First, a first embodiment of a display controlling apparatus, a display controlling method and a recording medium is described. Hereinafter, the first embodiment of the display controlling apparatus, the display controlling method and the recording medium is described by using a display controlling apparatus 1, to which the first embodiment of the display controlling apparatus, the display controlling method and the recording medium is applied.

[1-1: Configuration of the Display Controlling Apparatus 1]

Figure 1:
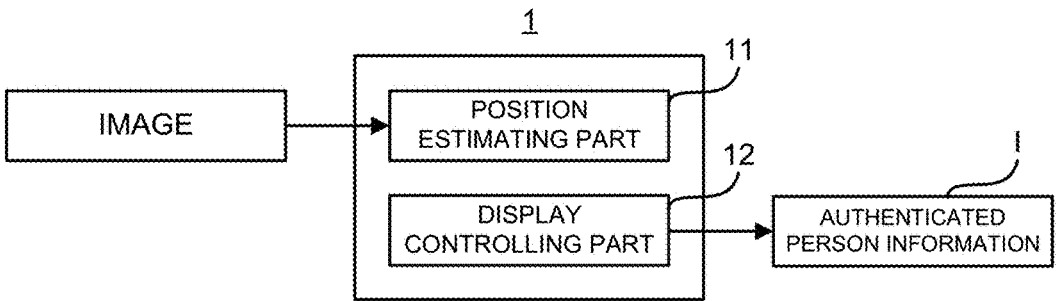
FIG. 1 is a block diagram showing a configuration of a display controlling apparatus in a first embodiment.

FIG. 1 is a block diagram showing a configuration of the display controlling apparatus 1 in the first embodiment. As shown in FIG. 1, the display controlling apparatus 1 comprises a position estimating part 11 and a display controlling part 12.

The position estimating part 11 estimates a position of an authenticated person from an image generated by imaging a predetermined space. The predetermined space may be a space in which the authenticated person is authenticated. An authentication mechanism may authenticate a person, who is in the predetermined space, as the authenticated person.

The display controlling part 12 controls display of authenticated person information I relating to the authenticated person, in accordance with the position of the authenticated person. The authenticated person information I relating to the authenticated person may be information relating to an authentication result, and may be any information relating to authentication.

[1-2: Display Controlling Operation Performed by the Display Controlling Apparatus 1]

Figure 2:
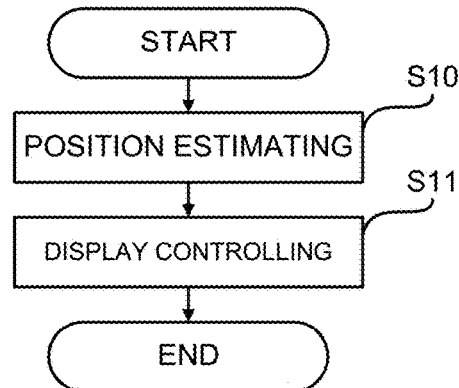
FIG. 2 is a flowchart showing flow of display controlling operation performed by the display controlling apparatus in the first embodiment.

Next, display controlling operation performed by the display controlling apparatus 1 in the first embodiment is described with referring to FIG. 2. FIG. 2 is a flowchart showing flow of the display controlling operation performed by the display controlling apparatus 1 in the first embodiment.

As shown in FIG. 2, the position estimating part 11 estimates the position of the authenticated person from the image generated by imaging the predetermined space (step S10). The display controlling part 12 controls display of the authenticated person information I relating to the authenticated person, in accordance with the position of the authenticated person (step S11).

[1-3: Technical Effect of the Display Controlling Apparatus 1]

As described above, the display controlling apparatus 1 in the first embodiment can appropriately display information to the authenticated person. Since the display controlling apparatus 1 controls display of the authenticated person information I relating to authentication of the authenticated person, in accordance with the position of the authenticated person, the authenticated person can receive the authenticated person information I when the authenticated person is at a position, at which the authenticated person can easily see display, i.e., convenience of the authenticated person is improved.

2: Second Embodiment

A second embodiment of a display controlling apparatus, a display controlling method and a recording medium is described. Hereinafter, the second embodiment of the display controlling apparatus, the display controlling method and the recording medium is described by using a display controlling apparatus 2, to which the second embodiment of the display controlling apparatus, the display controlling method and the recording medium is applied.

[2-1: Application Example of the Display Controlling Apparatus 2]

Figure 3:
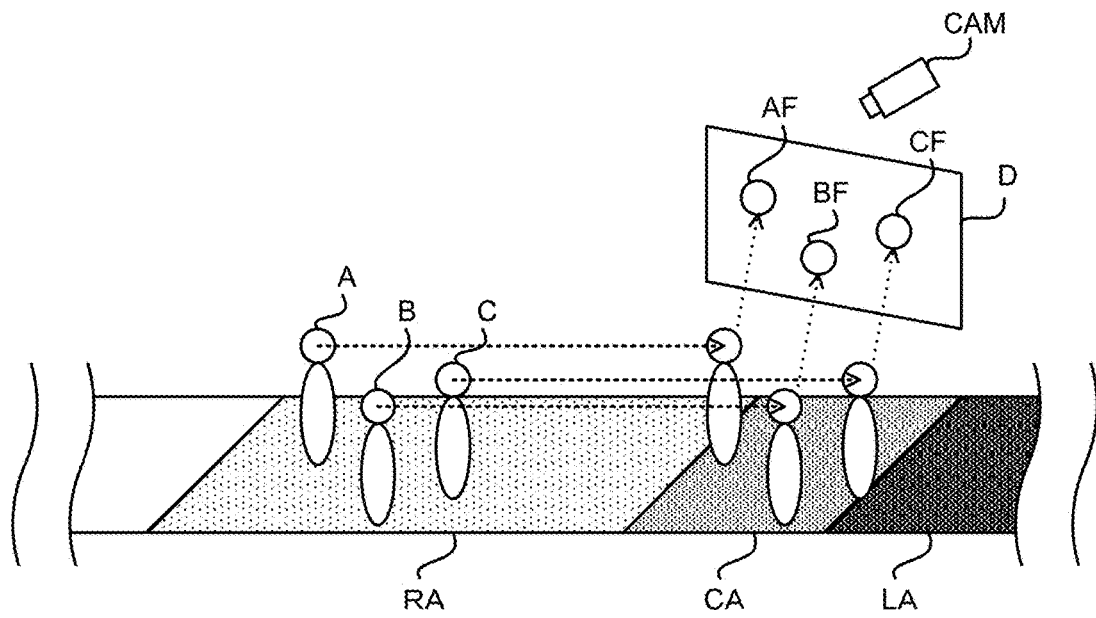
FIG. 3 is a conceptual scheme showing an example of a situation in which a display controlling apparatus in a second embodiment is applied.

First, an application example of the display controlling apparatus 2 in the second embodiment is described with referring to FIG. 3. FIG. 3 is a conceptual scheme showing an example of a situation in which the display controlling apparatus 2 in the second embodiment is applied. The display controlling apparatus 2 in the second embodiment may be applied to announcement operation, that indicates whether or not an authenticated person enters a restricted area LA defined in such as a theme park, an airport, a train station, an office and an event venue, to the authenticated person. For example, a mechanism, in which a general flapper gate or a face authentication terminal is installed, announcing an authentication result to an authenticated person may be replaced a mechanism, in which an authenticated person passing through an authentication area RA is authenticated.

In a situation exemplified in FIG. 3, it is supposed that there is a passage in which persons, who head to the restricted area LA shown on a right side of FIG. 3, flows from a left side to a right side. A virtual authentication area RA is set in front of an entrance to the restricted area LA. An authentication mechanism authenticates a person being in the authentication area RA, as an authenticated person. The authentication area RA may be an area of 5 meters×5 meters. A width of 5 meters is a width in which 5-6 authenticated persons can pass through at same time; there are 20-30 authenticated persons in the authentication area RA, and they may be passing through the authentication area RA. In the situation exemplified in FIG. 3, as shown by an arrow, an authenticated parson A, an authenticated person B and an authenticated person C move from the authentication area RA to the restricted area LA.

A confirmation area CA, in which a display D is disposed, is defined near the entrance to the restricted area LA or near an exit from the authentication area RA. An authenticated person can confirm whether or not authentication of oneself is successful by seeing the display D in the confirmation area CA. In the situation exemplified in FIG. 3, the display D may display a face image AF as the authenticated person information I of the authenticated person A, a face image BF as the authenticated person information I of the authenticated person B and a face image CF as the authenticated person information I of the authenticated person C, respectively when each of the authenticated person A, the authenticated person B and the authenticated person C passes through the confirmation area CA. Since the authenticated person can know whether or not he/she is rightly authenticated, the authenticated person can enter the restricted area LA with mind at ease. A camera CAM may be disposed around the display D, and may image a predetermined space for estimating position of authenticated persons. Wherein, a camera imaging an image used for authentication and a camera imaging an image for deciding an authenticated person displayed may be the same, or may differ from each other.

In other words, authenticated persons are authenticated while passing through the authentication area RA, rather than authenticating in order in a line, for example. Therefore, authenticated persons can be authenticated without stopping and without being conscious of being authenticated. Moreover, an authentication mechanism can authenticate a plurality of authenticated persons at the same timing, and can announce authentication results to the plurality of authenticated persons at the same timing. Authenticated persons can immediately confirm authentication results, and it is possible to realize a smooth authentication. It is possible to improve convenience for authenticated persons compared with a case, in which each authenticated person is authenticated one by one by using a flapper gate or a face authentication terminal, and turning consciousness of the authenticated person to a camera, for example.

[2-2: Configuration of the Display Controlling Apparatus 2]

Figure 4:
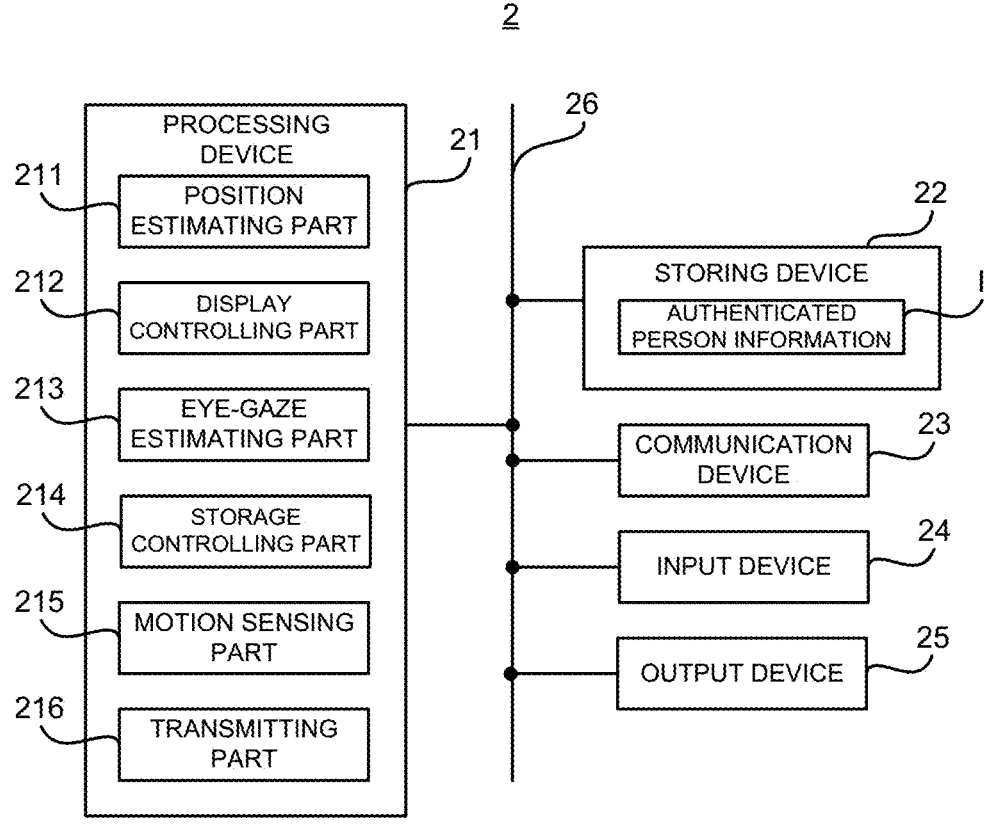
FIG. 4 is a block diagram showing a configuration of the display controlling apparatus in the second embodiment.

Next, a configuration of the display controlling apparatus 2 is described with referring to FIG. 4. FIG. 4 is a block diagram showing the configuration of the display controlling apparatus 2 in the second embodiment. Wherein, in the following description, a component already described is given the same reference sign and it's detail description is omitted.

As shown in FIG. 4, the display controlling apparatus 2 comprises a processing device 21 and a storing device 22. Furthermore, the display controlling apparatus 2 may comprise a communications device 23, an input device 24 and an output device 25. However, the display controlling apparatus 2 may not comprise at least one of the communication device 23, the input device 24 and the output device 25. The processing device 21, the storage device 22, the communication device 23, the input device 24 and the output device 25 may be connected through a data bus 26.

The processing device 21 includes at least one of a CPU (Central Processing Unit), a GPU (Graphics Processing Unit) and an FPGA (Field Programmable Gate Array), for example. The processing device 21 reads computer programs. For example, the processing device 21 may read a computer program stored in the storing device 22. For example, the processing device 21 may read a computer program recorded on a computer readable and non-transitory recording medium by using a not shown recording medium reading device (e.g., the input device 24 described later) comprised in the display controlling apparatus 2. The processing device 21 may acquire (in other words, download or read) a computer program from a not shown apparatus outside of the display controlling apparatus 2 through the communication device 23 (or another communication device). The processing device 21 executes read computer programs. As a result, logical functional blocks for performing operation to be performed by the display controlling apparatus 2 are realized in the processing device 21. In other words, the processing device 21 can function as a controller to realizing logical functional blocks for performing operation (i.e., process) to be performed by the display controlling apparatus 2.

FIG. 4 shows one example of logical functional blocks realized in the processing device 21 for performing display controlling operation. As shown in FIG. 4, in the processing device 21, a position estimating part 211, which is one specific example of a "position estimating means", a display controlling part 212, which is one specific example of a "display controlling means", an eye-gaze estimating part 213, which is one specific example of an "eye-gaze estimating means", a storage controlling part 214, which is one specific example of a "storage mean", a motion sensing part 215, which is one specific example of a "motion sensing means", and a transmitting part 216, which is one specific example of a "transmitting means", are realized.

Incidentally, operation of each of the position estimating part 211, the display controlling part 212, the eye-gaze estimating part 213, the motion sensing part 215 and the transmitting part 216 is described later with referring to FIG. 5. Wherein, the processing device 21 may not comprise at least one of the eye-gaze estimating part 213, the storage controlling part 214, the motion sensing part 215 and the transmitting part 216.

The storing device 22 can store desired data. For example, the storing device 22 may temporally store computer programs executed by the processing device 21. The storing device 22 may temporally store data temporally used by the processing device 21 when the processing device 21 is executing a computer program. The storing device 22 may store data to be stored for a long time by the display controlling apparatus 2. Wherein, the storing device 22 may include at least one of a RAM (Random Access Memory), a ROM (Read Only Memory), a hard disk device, an optical magnetic disk device, an SSD (Solid State Drive), and a disk array device. In other words, the storing device 22 may include non-transitory recording medium.

The communication device 23 can communicate with an apparatus outside of the display controlling apparatus 2 through a not shown communication network.

The input device 24 is a device receiving information input to the display controlling apparatus 2 from outside of the display controlling apparatus 2. For example, the input device 24 may include an operation device (e.g., at least one of a keyboard, a mouse and a touch panel) which can be operated by an operator of the display controlling apparatus 2. For example, the input device 24 may include a reading device, which can read information recorded, as data, on a recording medium being able to externally attach to the display controlling apparatus 2.

The output device 25 is a device outputting information to outside of the display controlling apparatus 2. The output device 25 may output information as images. In other words, the output device 25 may include a display device (so-called display) which can display an image indicating outputted information. For example, the output device 25 may output information as sound. In other words, the output device 25 may include a sound device (so-called speaker) which can output sound. For example, the output device 25 may output information to papers. In other words, the output device 25 may include a printing device (so-called printer) which can print desired information to papers.

[2-3: Display Controlling Operation Performed by the Display Controlling Apparatus 2]

Figure 5:
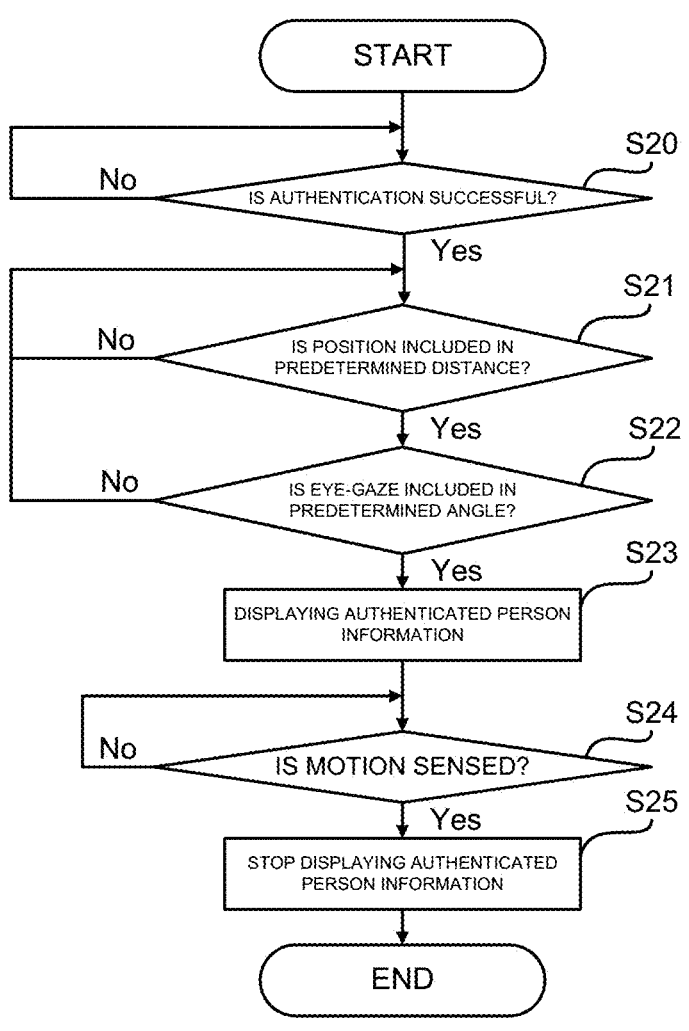
FIG. 5 is a flowchart showing flow of display controlling operation performed by the display controlling apparatus in the second embodiment.

Next, flow of display controlling operation performed by the display controlling apparatus 2 in the second embodiment is described with referring to FIG. 5. FIG. 5 is a flowchart showing the flow of the display controlling operation performed by the display controlling apparatus 2 in the second embodiment.

As shown in FIG. 5, the display controlling part 212 determines whether or not authentication of the authenticated person is successful (step S20). The authentication of the authenticated person may be face authentication. The face authentication may be operation extracts a feature amount of a face image for the face authentication acquired from a camera, collates with a feature amount registered in a database in advance, and identifies the authenticated person. Moreover, the authentication of the authenticated person may be iris authentication. The iris authentication may be operation extracts a feature amount of an iris image for the iris authentication acquired from a camera, collates with a feature amount registered in a database in advance, and identifies the authenticated person. Moreover, the authentication of the authenticated person may be multi-modal authentication using both of the face authentication and the iris authentication. The camera may be the camera CAM, or may be another device.

When the authentication of the authenticated person is not successful (step S20: No), return to the step S20. The display controlling part 212 repeats the process of the step S20 until the authentication of the authenticated person succeeds. The authentication of the authenticated person may be operation identifies the authenticated person when a registered face image and a face detected from an image are matching. The display controlling part 212 may keep information indicating the authenticated person authenticated, collate the kept information indicating the authenticated person and information indicating an authenticated person near the display D for displaying the authenticated person information I, and select an authenticated person whose the authenticated person information I is to be displayed.

When the authentication of the authenticated person is successful (step S20: Yes), the position estimating part 211 estimates a position of the authenticated person from an image generated by imaging a predetermined space. The position estimating part 211 may estimate the position of the authenticated person on the basis of at least one of a direction, in which the authenticated person heads, and walk velocity of the authenticated person. The position estimating part 211 may estimate the position of the authenticated person from an image captured by the camera CAM. The position estimating part 211 may trace the position of the authenticated person, and may estimate a direction, in which the authenticated person heads. The position estimating part 211 may predict an authenticated person who will appear in front of the display D.

The display controlling part 212 whether or not the position of the authenticated person in the authentication area RA from the display is included in a predetermined distance from the display D. When the position of the authenticated person is not included in the predetermined distance from the display D (step S21), return to the step S21. The display controlling part 212 repeats the process of the step S21 until the position of the authenticated person is included in the predetermined distance from the display D. In other words, the display controlling part 212 may display information of an authenticated person near the display D, and may not display information of an authenticated person far from the display D.

When the position of the authenticated person is included in the predetermined distance from the display D (step S21: Yes), the eye-gaze estimating part 213 estimates an eye-gaze of the authenticated person. The eye-gaze estimating part 213 may estimate an eye-gaze from an image captured by the camera CAM. The eye-gaze estimating part 213 may estimate an angle of an eye-gaze to a direction of the camera CAM, which is important for estimating an eye-gaze, from features around eyes. The eye-gaze estimating part 213 may calculate a distance to a target from, for example, a distance between eyes and a resolution of the camera CAM, and may decide where he/she is looking.

The display controlling part 212 determines whether or not the eye-gaze of the authenticated person is directed to the display D (step S22). When the eye-gaze of the authenti-cated person is directed to the display D (step S22: Yes), the display controlling part 212 displays an authentication result as the authenticated person information I on the display D (step S23). The display controlling part 212 may control at least one of a timing, at which the authenticated person information I is displayed, and a position in the display D, in which the authenticated person information I is to be displayed. When the eye-gaze of the authenticated person is not directed to the display D (step S22: No), return to the step S21. The display controlling part 212 repeats processes of the step S21 and the step S22 until the eye-gaze of the authenticated person is directed to the display D when the position of the authenticated person is included in the predetermined distance from the display D.

However, the display controlling part 212 may display the authentication result as the authenticated person information I on the display D when the position of the authenticated person is included in the predetermined distance from the display D, even when the eye-gaze of the authenticated person is not directed to the display D. The display control-ling part 212 may display the authentication result as the authenticated person information I on the display D when eye-gaze of the authenticated person is directed to the display D, even when the position of the authenticated person is not included in the predetermined distance from the display D.

The display controlling part 212 may decide a display D for displaying the authenticated person information I from a plurality of displays, and may decide a position in the display D for displaying the authenticated person informa-tion I. In other words, the display controlling part 212 controls at least one of a timing, at which the authenticated person information I is displayed, and a position of a display for displaying the authenticated person information I. Con-trolling the position of the display for displaying the authen-ticated person information I may include selecting a display for displaying the authenticated person information I from a plurality of displays, and controlling a displayed position in the display for displaying the authenticated person informa-tion I.

Figure 6:
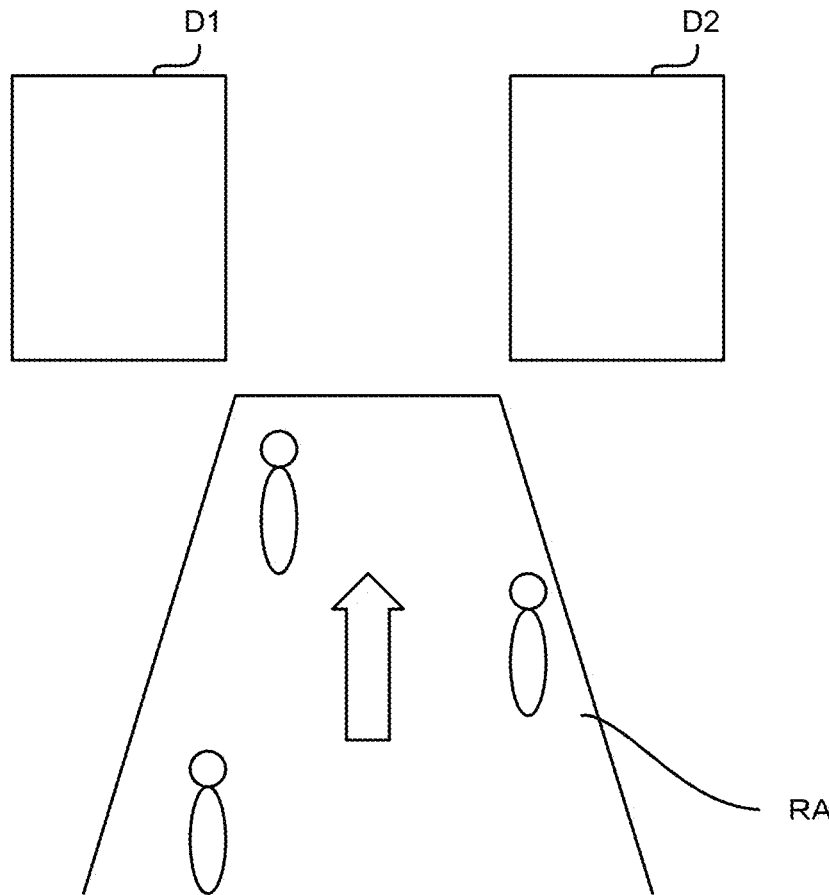
FIG. 6 is a conceptual scheme showing an example of a situation in which a display controlling apparatus in the second and third embodiments is applied.

As shown in FIG. 6, for example, two displays D1 and D2 may be disposed at near an exit of the authentication area RA. An arrow in the figure may indicate a travel direction of authenticated persons in the authentication area RA.

When a travel direction of an authenticated person is a direction to the display D1, the display controlling part 212 may display an authentication result as the authenticated person information I of the authenticated person on the display D1. Alternatively, when a travel direction of an authenticated person is a direction to the display D2, the display controlling part 212 may display an authentication result as the authenticated person information I of the authenticated person on the display D2.

Moreover, when an eye-gaze of an authenticated person is directed to the display D1, the display controlling part 212 may display an authentication result as the authenticated person information I of the authenticated person on the display D1. Alternatively, when an eye-gaze of an authen-ticated person is directed to the display D2, the display controlling part 212 may display an authentication result as the authenticated person information I of the authenticated person on the display D2.

Since the display controlling part 212 displays the authen-ticated person information I ahead of an eye-gaze of an authenticated person, the authenticated person can easily find the authenticated person information I of oneself. Since the display controlling part 212 determines a position for displaying the authenticated person information I according to at least one of a height of a head, a height of an eye-gaze and a direction of an eye-gaze of an authenticated person, the authenticated person can naturally find the authenticated person information I of oneself. Moreover, the display controlling part 212 may display the authenticated person information I on a side, in which an authenticated person is guided, in the display D. For example, when an authenticated person will be guided to a right side, the display controlling part 212 may display information of the authenticated person on a right side of the display D. Alternatively, when an authenticated person will be guided to a left side, the display controlling part 212 may display information of the authenticated person on a left side of the display D.

The motion sensing part 215 senses an authenticated person performing a predetermined motion. The display controlling part 212 determines whether or not the motion sensing part 215 senses an authenticated person performing the predetermined motion (step S24). The predetermined motion performed by the authenticated person may be such as a nodding motion, an OK pose motion and eye-gaze movement. When the authenticated person performing the predetermined motion is sensed (step S24: Yes), the display controlling part 212 stops displaying an authentication result as the authenticated person information I (step S25). When the authenticated person performing the predetermined motion is not sensed (step S24: No), return to the step S24.

The authenticated person information I displayed on the display D may be information that only a person himself/herself can recognize. For example, an avatar known only to the person himself/herself may be displayed as the authenticated person information I. It is possible to prevent personal information from being known to others, and therefore to protect privacy.

Moreover, the transmitting part 216 may transmit the authenticated person information I to a terminal device carried by an authenticated person at least one of a case, in which authentication of the authenticated person is ended, and a case, in which authenticated persons are no longer in the authentication area RA. The transmitting part 216 may transmit push notification to the terminal device by using the authenticated person exiting from the authentication area RA as a trigger. The terminal device may be a smartphone, a smartwatch, an AR glasses, a VR goggles, etc. In this case, the authenticated person information I may be information, which can be seen, information, which can be touch such as vibration, or information, which can be heard such as sound.

Moreover, the transmitting part 216 may transmit the authenticated person information I to the terminal device carried by the authenticated person when the motion sensing part 215 does not sense the authenticated person performing the predetermined motion in a predetermined term from the display controlling part 212 displaying an authentication result as the authenticated person information I on a display. The case, in which the motion sensing part 215 does not sense the authenticated person performing the predetermined motion in the predetermined term, may be a case, in which an eye-gaze of the authenticated person is not directed to the display after display control of the display controlling part 212, a case, in which the authenticated person does not appear in front of the display at estimated position and timing, etc. By transmitting push notification to the terminal device of the authenticated person in these cases, it is possible to improve likelihood of recognizing notification.

Moreover, for example, when authentication of an authenticated person is successful, the transmitting part 216 may determine whether destination information such as an ID, a mail address of a terminal device corresponding to the authenticated person is registered, then, the transmitting part

216 may transmit push notification to the terminal device if the destination information is registered, or the display controlling part 212 may display the authenticated person information I on a display if the destination information is not registered.

Moreover, for example, the output device 25 may output sound information, that only a person himself/herself can hear, from a directional speaker. The output device 25 may output sound indicating permitted to pass a gate such as PiPi, or sound indicating not permitted to pass the gate such as PiPiPi, to an authenticated person exiting from the authentication area RA from a directional speaker.

If the display D displays information about all authenticated persons, who have been authenticated, authenticated persons difficult to find the authenticated person information I of oneself. This prevents to smoothly authenticate, and reduces convenience of authenticated persons. In contract, in the second embodiment, since the authenticated person information I, which corresponds to an authenticated person confirming, is displayed in the confirmation area CA, it is possible to operate authentication result notification with high convenience. Furthermore, since a displayed position in the display D is devised, an authenticated person can easily find the authenticated person information I of oneself.

[2-4: Technical Effect of the Display Controlling Apparatus 2]

As described above, the display controlling apparatus 2 in the second embodiment can improve convenience of an authenticated person because the display controlling part 212 displays the authenticated person information I on the display D when an eye-gaze of the authenticated person is directed to the display D, thereby the authenticated person, who confirms the authenticated person information I, can easily find information of oneself. Since display is performed according to motion of the authenticated person by the display controlling part 212 controlling at least one of a timing, at which the authenticated person information I is displayed, and a displayed position in the display D for displaying the authenticated person information I, the authenticated person can easily find the authenticated person information I of oneself.

Since the display controlling part 212 stop displaying the authenticated person information I when an authenticated person performing a predetermined motion is sensed, it is possible to prevent that the authenticated person does not receive the authenticated person information I. Moreover, since display of the authenticated person information I, which is no longer required to be displayed, is not left displayed on the display D, an authenticated person, who wish to confirm the authenticated person information I, can easily find the authenticated person information I of oneself.

If the transmitting part 216 transmits the authenticated person information I to a terminal device carried by an authenticated person at a transmission timing, at which authentication of the authenticated person is ended, the authenticated person can immediately know that authentication of oneself is ended. Moreover, even if the transmission timing is a timing, at which authenticated persons are no longer present in a predetermined space, authenticated persons can certainly recognize that authentication of oneself is ended.

3: Third Embodiment

Next, a third embodiment of a display controlling apparatus, a display controlling method and a recording medium is described. Hereinafter, the third embodiment of the display controlling apparatus, the display controlling method and the recording medium is described by using a display controlling apparatus 3 to which the third embodiment of the display controlling apparatus, the display controlling method and the recording medium is applied.

The display controlling apparatus 3 in the third embodiment may have configuration which is the same as the configuration of the display controlling apparatus 2 of the above-mentioned second embodiment. The display controlling apparatus 3 in the third embodiment differs in the authenticated person information I stored by the storage controlling part 214 and display controlling operation compared with the display controlling apparatus 2 in the second embodiment.

TABLE 1

| Authenticated person | Status |
|---|---|
| A | E |
| B | F |
| C | G |
| D | H |

TABLE 2

| Status | Destination |
|---|---|
| E | I |
| F | J |
| G | K |
| H | L |

The storage controlling part 214 may store the authenticated person information I, which associates authenticated persons and destinations of authenticated persons, to the storing device 22. The storage controlling part 214 may store authenticated persons and statuses of authenticated persons in associated with each other as exemplified in the above-mentioned table 1, and may store statuses and destinations according to statuses in associated with each other as exemplified in the above-mentioned table 2. The authenticated person information I may include at least one of information associating authenticated persons with destinations of authenticated persons, information associating authenticated persons with statuses of authenticated persons, and information associating statuses and destinations according to statuses. Wherein, the storing device 22 may not store the authenticated person information I.

For example, when an authenticated person will board an airplane in an airport, the statuses may include statuses such as before boarding procedures (E), before baggage check-in (F), before security check (G), and after security check (H). If a status of an authenticated person A is before boarding procedures (E), a destination of the authenticated person A may be an automatic check-in machine (I). If a status of an authenticated person B is before baggage check-in (F), a destination of the authenticated person B may be a baggage counter (J). If a status of an authenticated person C is before security check (G), a destination of the authenticated person C may be a security checkpoint (K). If a status of an authenticated person D is after security check (H), a destination of the authenticated person D may be a boarding gate (L).

[3-1: Display Controlling Operation Performed by the Display Controlling Apparatus 3]

Figure 7:
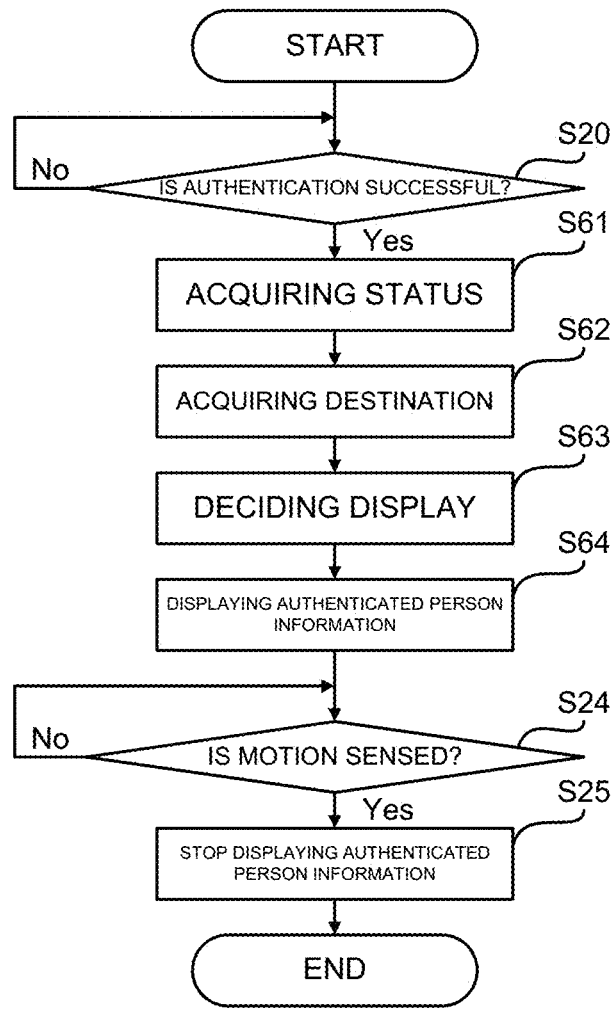
FIG. 7 is a flowchart showing flow of display controlling operation performed by a display controlling apparatus in the third embodiment.
Figure 8:
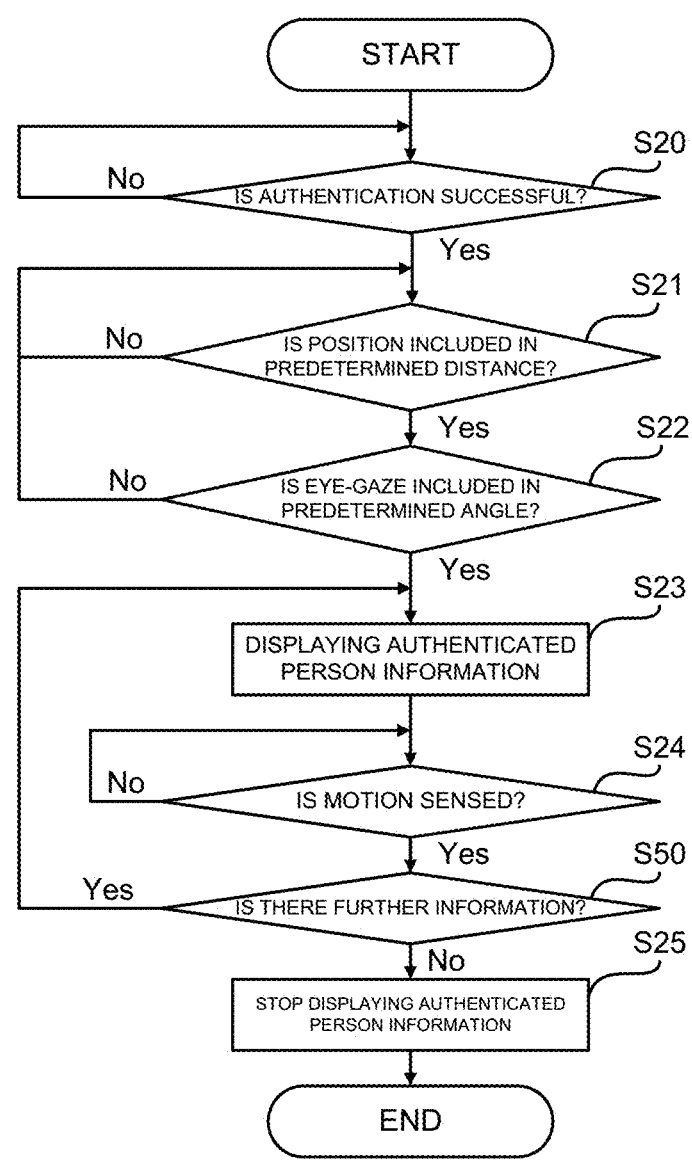
FIG. 8 is a flowchart showing flow of display controlling operation performed by a display controlling apparatus in a fourth embodiment.

Next, display controlling operation performed by the display controlling apparatus 3 in the third embodiment is described with referring to FIG. 7. FIG. 7 is a flowchart showing flow of the display controlling operation performed by the display controlling apparatus 3 in the third embodiment.

As shown in FIG. 7, the display controlling part 212 determines whether or not authentication of an authenticated person is successful (step S20). When the authentication of the authenticated person is not successful (step S20: No), return to the step S20.

When the authentication of the authenticated person is successful (step S20: Yes), the display controlling part 212 acquires a status of the authenticated person with referring to the authenticated person information I (step S61). The display controlling part 212 acquires a destination corresponding to the status of the authenticated person (step S62). The display controlling part 212 decides a display for displaying the authenticated person information I on the basis of acquired information of the destination (step S63). The display controlling part 212 display the authenticated person information I on the display decided in the step S63 (step S64).

Operations of the step S24-the step S25 are similar to operations described with referring to FIG. 5.

As shown in FIG. 6, for example, two displays D1 and D2 may be disposed near the exit of the authentication area RA. The arrow in the figure may indicate the travel direction of authenticated persons in the authentication area RA.

For example, when the destination of the authenticated person is a left side in FIG. 6, the display controlling part 212 may display the authenticated person information I on the display D1 disposed at the left side, and may guide the authenticated person to the destination of the authenticated person. Alternatively, when the destination of the authenticated person is a right side in FIG. 6, the display controlling part 212 may display the authenticated person information I on the display D2 disposed at the right side, and may guide the authenticated person to the destination of the authenticated person.

[3-2: Technical Effect of the Display Controlling Apparatus 3]

Since the display controlling part 212 displays the authenticated person information I on the display D corresponding to the destination of the authenticated person, it is possible to guide the authenticated person to the destination of the authenticated person. When a plurality of displays present, the most suitable display can display the authenticated person information I. Since the destination of the authenticated person is decided according to the status of the authenticated person, the display controlling part 212 displays the authenticated person information I on the display D corresponding to the destination of the authenticated person, thereby it is possible to guide the authenticated person to the destination of the authenticated person.

4: Fourth Embodiment

Next, a fourth embodiment of a display controlling apparatus, a display controlling method and a recording medium is described. Hereinafter, the fourth embodiment of the display controlling apparatus, the display controlling method and the recording medium is described by using a display controlling apparatus 4 to which the fourth embodiment of the display controlling apparatus, the display controlling method and the recording medium is applied.

The display controlling apparatus 4 in the fourth embodiment may have configuration which is the same as configuration of the display controlling apparatus 2 in the second embodiment and the display controlling apparatus 3 in the third embodiment. The display controlling apparatus 4 in the fourth embodiment differs in display controlling operation compared with the display controlling apparatus 2 in the second embodiment or the display controlling apparatus 3 in the third embodiment. In a case, in which information announced to an authenticated person presents, other than authenticated person information, when performing a predetermined motion is sensed, the display controlling part 212 in the fourth embodiment controls display of the information.

[4-1: Display Controlling Operation Performed by the Display Controlling Apparatus 4]

Figure 10:
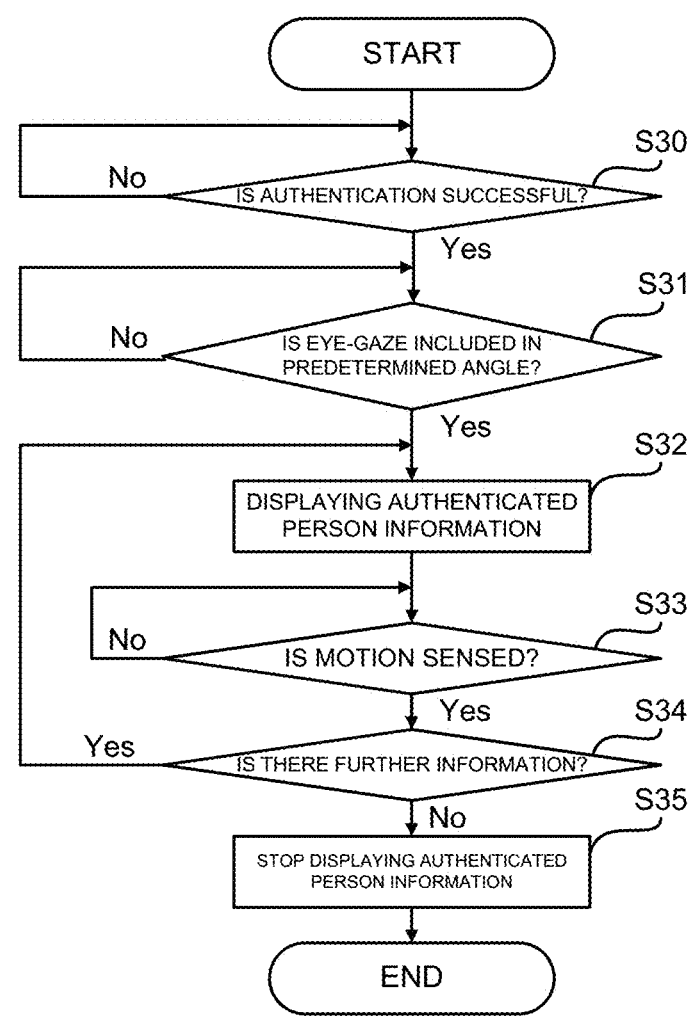
FIG. 10 is a flowchart showing flow of display controlling operation performed by the display controlling apparatus in the fifth embodiment.

Next, display controlling operation performed by the display controlling apparatus 4 in the fourth embodiment is described with referring to FIG. 10. FIG. 10 is a flowchart showing flow of the display controlling operation performed by the display controlling apparatus 4 in the fourth embodiment.

As shown in FIG. 10, the display controlling operation performed by the display controlling apparatus 4 in the fourth embodiment performs a step S50 before stopping displaying an authenticated person information in the step S25.

The display controlling part 212 determines whether or not information announced to the authenticated person, other than an authentication result, presents (step S50). When the information announced to the authenticated person presents (step S50: Yes), proceed the step S23, and then the authenticated person information I to be announced is displayed. In a case, in which information announced to the authenticated person presents, other than an authentication result, when performing a predetermined motion is sensed, the display controlling part 212 may display the information on the display D. The display controlling part 212 may specify a destination of an authenticated person from information stored in the storing device 22, and may display the authenticated person information I on the display D corresponding to the destination. The display controlling part 212 may decide a displayed position according to a destination and a route of an authenticated person. When the information announced to the authenticated person absents (step S50: No), the display controlling part 212 stops displaying information to the authenticated person (step S25).

[4-2: Technical Effect of the Display Controlling Apparatus 4]

In a case, in which information announced to an authenticated person presents, other than an authentication result, when performing a predetermined motion is sensed, the display controlling part 212 display the information on the display D, thereby the authenticated person can easily recognize necessary information other than the authentication result.

5: Fifth Embodiment

Next, a fifth embodiment of a display controlling apparatus, a display controlling method and a recording medium is described. Hereinafter, the fifth embodiment of the display controlling apparatus, the display controlling method and the recording medium is described by using a display controlling apparatus 5 to which the fifth embodiment of the display controlling apparatus, the display controlling method and the recording medium is applied.

[5-1: Application Example of the Display Controlling Apparatus 5]

Figure 9:
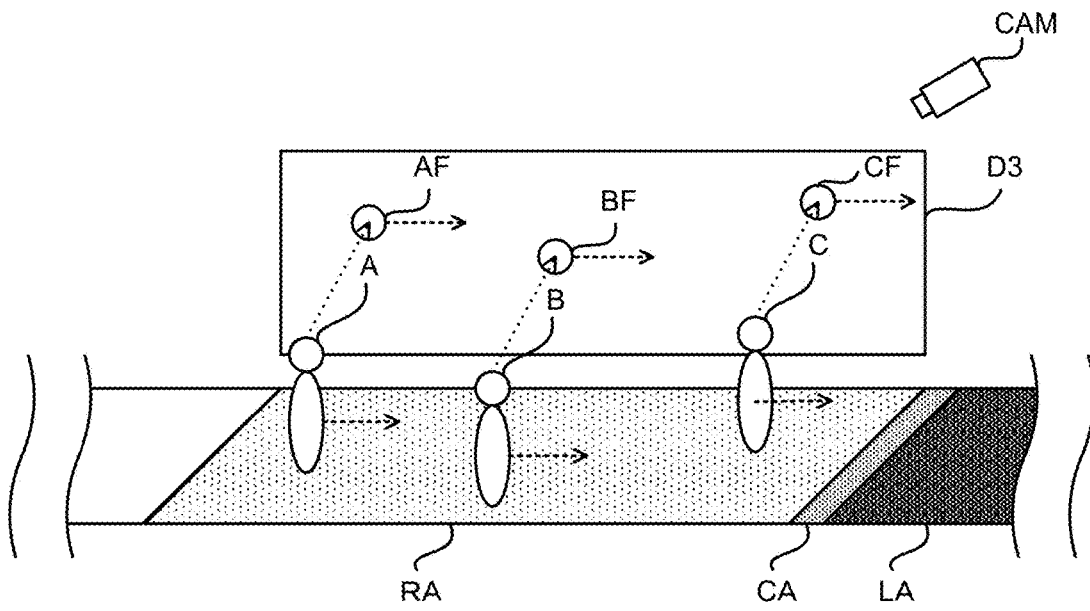
FIG. 9 is a conceptual scheme showing an example of a situation in which a display controlling apparatus in a fifth embodiment is applied.

An application example of the display controlling apparatus 5 in the fifth embodiment is described with referring to FIG. 9. FIG. 9 is a conceptual scheme showing an example of a situation in which the display controlling apparatus 5 in the fifth embodiment is applied. The display controlling apparatus 5 in the fifth embodiment, in a similar the display controlling apparatus 2 in the second embodiment, may also be applied to announcement operation, that indicates whether or not an authenticated person enters a restricted area LA defined in such as a theme park, an airport, a train station, an office and an event venue, to the authenticated person. For example, a mechanism, in which a general flapper gate or a face authentication terminal is installed, announcing an authentication result to an authenticated person may be replaced a mechanism, in which an authenticated person passing through an authentication area RA is authenticated.

In a situation exemplified in FIG. 9, it is supposed that there is a passage in which persons, who head to the restricted area LA shown on a right side of FIG. 9, flows from a left side to a right side. A virtual authentication area RA is set in front of an entrance to the restricted area LA. An authentication mechanism authenticates a person being in the authentication area RA, as an authenticated person. The authentication area RA may be an area of 5 meters×10 meters. A width of 5 meters is a width in which 5-6 authenticated persons can pass through at same time; there are 50-60 authenticated persons in the authentication area RA, and they may be passing through the authentication area RA. In the situation exemplified in FIG. 9, as shown by an arrow, an authenticated parson A, an authenticated person B and an authenticated person C move from the authentication area RA to the restricted area LA.

A display D3 for displaying authenticated person information I is disposed on a wall of the authentication area RA. In the situation exemplified in FIG. 9, the display D3 displays a face image AF as authenticated person information of the authenticated person A, a face image BF as authenticated person information of the authenticated person B and a face image CF as authenticated person information of the authenticated person C, respectively, when authentication of the authenticated person A, the authenticated person B and the authenticated person C end.

A confirmation area CA is defined near the entrance to the restricted area LA or near an exit from the authentication area RA. An authenticated person may be able to confirm whether or not authentication of oneself is successful by announcement from a terminal device held by oneself in the confirmation area CA. Since the authenticated person can know whether or not he/she is rightly authenticated, the authenticated person can enter the restricted area LA with mind at ease. A camera CAM may be disposed around the exit from the authentication area RA, and may image a predetermined space for estimating positions of authenticated persons. Wherein, a camera imaging an image used for authentication and a camera imaging an image for deciding an authenticated person displayed may be the same, or may differ from each other.

In other words, also in the fifth embodiment, authenticated persons are authenticated while passing through the authentication area RA, rather than authenticating in order in a line, for example. Therefore, authenticated persons can be authenticated without being conscious of being authenticated. Moreover, an authentication mechanism can authenticate a plurality of authenticated persons at the same timing, and can announce authentication results to the plurality of authenticated persons at the same timing. Authenticated persons can immediately confirm authentication results, and it is possible to realize a smooth authentication. It is possible to improve convenience for authenticated persons compared with a case, in which each authenticated person is authenticated one by one by using a flapper gate or a face authentication terminal, and turning consciousness of the authenticated person to a camera, for example.

[5-2: Configuration of the Display Controlling Apparatus 5]

The display controlling apparatus 5 in the fifth embodiment may have configuration, which is the same as configuration of the above-mentioned display controlling apparatus 2 in the second embodiment. The display controlling apparatus 5 in the fifth embodiment differs in a timing, at which display controlling operation is performed, compared with the display controlling apparatus 2 in the second embodiment. Specifically, a timing, at which the display controlling apparatus 2 in the second embodiment performs the display controlling operation, is a timing, at which an authenticated person exits from the authentication area RA. In contrast, a timing, at which the display controlling apparatus 5 in the fifth embodiment performs display controlling operation, is a timing, at which authentication ends. The display controlling part 212 display the authenticated person information I on the display D3 according to a position of an authenticated person when authentication of the authenticated person ends. Moreover, in the second embodiment, the display D as a target controlled for display is disposed in the confirmation area CA. In contrast, in the fifth embodiment, the display D3 as the target controlled for display is disposed in the authentication area RA.

[5-3: Display Controlling Operation Performed by the Display Controlling Apparatus 5]

Next, display controlling operation performed by the display controlling apparatus 5 in the fifth embodiment is described with referring to FIG. 10. FIG. 10 is a flowchart showing flow of the display controlling operation performed by the display controlling apparatus 5 in the fifth embodiment.

As shown in FIG. 10, the display controlling part 212 determines whether or not authentication of an authenticated person is successful (step S30). When the authentication of the authenticated person is not successful (step S30: No), return to the step S30. The display controlling part 212 repeats the process of the step S30 until the authentication of the authenticated person is successful.

When the authentication of the authenticated person is successful (step S30: Yes), the eye-gaze estimating part 213 estimates an eye-gaze of the authenticated person. The display controlling part 212 determines whether or not the eye-gaze of the authenticated person is directed to the display D3 for displaying authenticated person information I (step S31). When the eye-gaze of the authenticated person is directed to the display D3 (step S31: Yes), the display controlling part 212 displays an authentication result as the authenticated person information I on the display D3 (step S32). The display controlling part 212 may control at least one of a timing, at which the authenticated person information I is displayed, and a displayed position on the display D for displaying the authenticated information I. In a situation shown in FIG. 9, the display controlling part 212 may display the face image AF, BF or CF at a position of the display D3 corresponding to a position slightly forward of a position of the authenticated person A, B or C, because the authenticated person A, B or C moves.

When the eye-gaze of the authenticated person is not directed to the display D3 (step S31: No), return to the step S31. The display controlling part 212 repeats the process of the step S31 until the eye-gaze of the authenticated person is directed to the display D3.

Wherein, when a predetermined time has passed without the eye-gaze of the authenticated person being directed to the display D3 even if the process of the step S31 is repeatedly performed, the transmitting part 216 may transmit the authenticated person information I to a terminal device carried by the authenticated person. The transmitting part 216 may transmit push notification to the terminal device by using the authenticated person exiting from the authentication area RA as a trigger.

The display controlling part 212 may decide a position for display on the display D3. When the display controlling part 212 displays the authenticated person information I ahead of an eye-gaze of an authenticated person, the authenticated person can easily find the authenticated person information I of oneself. Since the display controlling part 212 determines a position for displaying the authenticated person information I according to at least one of a height of a head, a height of an eye-gaze and a direction of an eye-gaze of an authenticated person, the authenticated person can naturally find the authenticated person information I of oneself.

Moreover, the position estimating part 211 may estimate a position of an authenticated person, and the display controlling part 212 may move a position for displaying authenticated person information I on the display D3. When an authenticated person moves from left to right in the figure, the display controlling part 212 may move from left to right the position for displaying the authenticated person information I.

The motion sensing part 215 senses an authenticated person performing a predetermined motion. The display controlling part 212 determines whether or not the motion sensing part 215 senses the authenticated person performing the predetermined motion (step S33). The predetermined motion performed by the authenticated person may be such as a nodding motion, an OK pose motion and eye-gaze movement. When the authenticated person performing the predetermined motion is sensed (step S33: Yes), the display controlling part 212 stops displaying an authentication result as the authenticated person information I. The display controlling part 212 determines whether or not information announced to the authenticated person presents, other than the authentication result (step S34). When the information announced to the authenticated person presents (step S34: Yes), proceed the step S32, and then the information announced is displayed. In a case, in which information announced to an authenticated person presents, other than an authentication result, when the predetermined motion is sensed, the display controlling part 212 may display the information on the display D3. When information announced to the authenticated person absents, the display controlling part 212 stops displaying information for the authenticated person (step S35).

The authenticated person information I displayed on the display D3 may be information that only a person himself/herself can recognize. For example, an avatar known only to the person himself/herself may be displayed as the authenticated person information I. It is possible to prevent personal information from being known to others, and therefore to protect privacy.

Moreover, the transmitting part 216 may transmit the authenticated person information I to a terminal device carried by an authenticated person at least one of a case, in which authentication of the authenticated person is ended, and a case, in which authenticated persons are no longer in the authentication area RA. The transmitting part 216 may transmit push notification to the terminal device by using the authenticated person exiting from the authentication area RA as a trigger. The terminal device may be a smartphone, a smartwatch, an AR glasses, a VR goggles, etc. In this case, the authenticated person information I may be information, which can be seen, information, which can be touch such as vibration, or information, which can be heard such as sound.

Moreover, for example, the output device 25 may output sound information, that only a person himself/herself can hear, from a directional speaker. The output device 25 may output sound indicating permitted to pass a gate such as PiPi, or sound indicating not permitted to pass the gate such as PiPiPi, to an authenticated person at least one of a case, in which authentication of the authenticated person is ended, and a case, in which authenticated persons are no longer in the authentication area RA.

[5-4: Technical Effect of the Display Controlling Apparatus 5]

The display controlling apparatus 5 in the fifth embodiment can announce success of authentication at a timing, at which authentication succeeds, thereby the display controlling apparatus 5 has excellent immediacy. Additionally, since the display controlling part 212 devises a position for displaying on the display D3, an authenticated person can easily find information of oneself.

6: Sixth Embodiment

Nest, a sixth embodiment of a display controlling apparatus, a display controlling method and a recording medium is described. Hereinafter, the sixth embodiment of the display controlling apparatus, the display controlling method and the recording medium is described by using a display controlling apparatus 6 to which the sixth embodiment of the display controlling apparatus, the display controlling method and the recording medium is applied.

[6-1: Application Example of the Display Controlling Apparatus 6]

Figure 11:
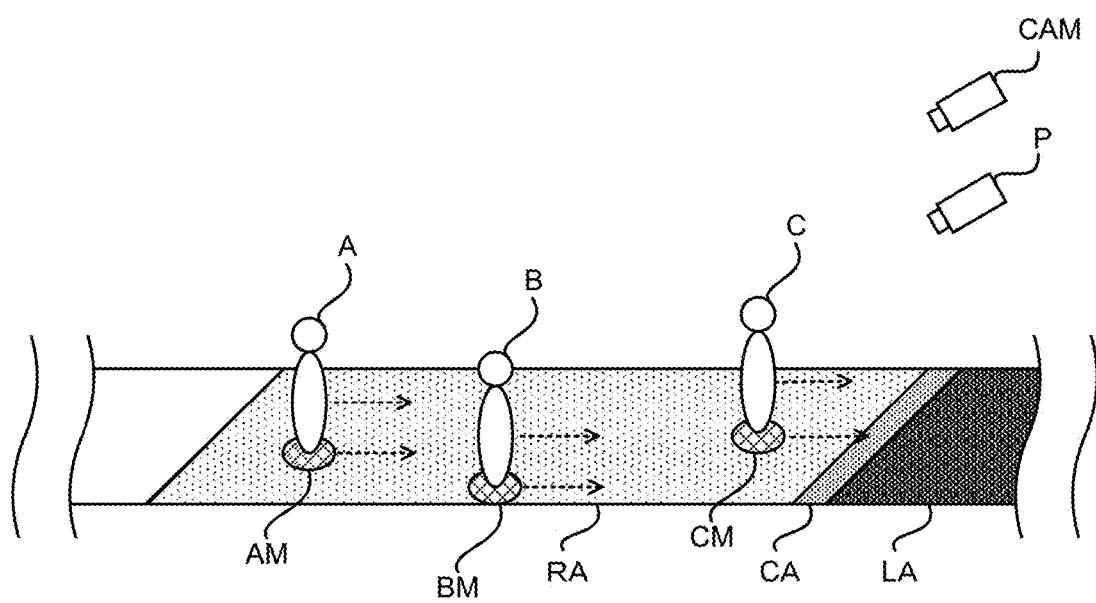
FIG. 11 is a conceptual scheme showing an example of a situation in which a display controlling apparatus in a sixth embodiment.

An application example of the display controlling apparatus 6 in the sixth embodiment is described with referring to FIG. 11. FIG. 11 is a conceptual scheme showing an example of a situation in which the display controlling apparatus 6 in the sixth embodiment is applied. The display controlling apparatus 6 in the sixth embodiment, in a similar the display controlling apparatus 2 in the second embodiment and the display controlling apparatus 5 in the fifth embodiment, may also be applied to announcement operation, that indicates whether or not an authenticated person enters a restricted area LA defined in such as a theme park, an airport, a train station, an office and an event venue, to the authenticated person. For example, a mechanism, in which a general flapper gate or a face authentication terminal is installed, announcing an authentication result to an authenticated person may be replaced a mechanism, in which an authenticated person passing through an authentication area RA is authenticated.

In a situation exemplified in FIG. 11, it is supposed that there is a passage in which persons, who head to the restricted area LA shown on a right side of FIG. 11, flows from a left side to a right side. A virtual authentication area RA is set in front of an entrance to the restricted area LA. An authentication mechanism authenticates a person being in the authentication area RA, as an authenticated person. The authentication area RA may be an area of 5 meters×10 meters. A width of 5 meters is a width in which 5-6 authenticated persons can pass through at same time; there are 50-60 authenticated persons in the authentication area RA, and they may be passing through the authentication area RA. In the situation exemplified in FIG. 11, as shown by an arrow, an authenticated parson A, an authenticated person B and an authenticated person C move from the authentication area RA to the restricted area LA.

A projected image showing authenticated person information I is projected on a floor of the authentication area RA. In the situation exemplified in FIG. 11, the display controlling part 212 may project each of a projected image AM as authenticated person information I of the authenticated person A, a projected image BM as authenticated person information I of the authenticated person B, and a projected image CM as authenticated person information I of the authenticated person C on the floor of the authentication area RA when authentication of each of the authenticated person A, the authenticated person B and the authenticated person C ends.

A projected image may be an image of three-dimensional gate. When authentication of an authenticated person is successful, the projected image showing a gate opened may be projected; when authentication of an authenticated person is failed, the projected image showing a gate closed may be projected. Moreover, a destination of an authenticated person, as the projected image, may be projected. For example, an arrow indicating a direction to the destination may be projected; a specify character string, a symbol, etc. indicating the destination such as "GATE A" may be projected.

The above-mentioned projected image may be projected by a projecting apparatus P. The projecting apparatus P may be disposed at a predetermined position at which projecting the above-mentioned projected image can be realized. The projecting apparatus P may be any projecting apparatus such as a projector projecting a desired image by using a light source such as a lamp or an LED (Light Emitting Diode).

A confirmation area CA is defined near the entrance to the restricted area LA or near an exit from the authentication area RA. An authenticated person may be able to confirm whether or not authentication of oneself is successful by announcement from a terminal device held by oneself in the confirmation area CA. Since the authenticated person can know whether or not he/she is rightly authenticated, the authenticated person can enter the restricted area LA with mind at ease. A camera CAM may be disposed around the exit from the authentication area RA, and may image a predetermined space for estimating positions of authenticated persons. Wherein, a camera imaging an image used for authentication and a camera imaging an image for deciding an authenticated person displayed may be the same, or may differ from each other.

In other words, also in the sixth embodiment, authenticated persons are authenticated while passing through the authentication area RA, rather than authenticating in order in a line, for example. Therefore, authenticated persons can be authenticated without being conscious of being authenticated. Moreover, an authentication mechanism can authenticate a plurality of authenticated persons at the same timing, and can announce authentication results to the plurality of authenticated persons at the same timing. Authenticated persons can immediately confirm authentication results, and it is possible to realize a smooth authentication. It is possible to improve convenience for authenticated persons compared with a case, in which each authenticated person is authenticated one by one by using a flapper gate or a face authentication terminal, and turning consciousness of the authenticated person to a camera, for example.

[6-2: Configuration of the Display Controlling Apparatus 6]

The display controlling apparatus 6 in the sixth embodiment may have configuration, which is the same as configuration of the display controlling apparatus 2 in the second embodiment and the display controlling apparatus 5 in the fifth embodiment. The display controlling apparatus 6 in the sixth embodiment differs in a form of announcement for authenticated person information I compared with the display controlling apparatus 2 in the second embodiment—the display controlling apparatus 5 in the fifth embodiment. Specifically, a form of announcement for the authenticated person information I of the display controlling apparatus 2 in the second embodiment—the display controlling apparatus 5 in the fifth embodiment is that the display D shows the information. In contrast, a form of announcement for the authenticated person information I of the display controlling apparatus 6 in the sixth embodiment is that the projecting apparatus P projects the projected image associated with the authenticated person information I on such as a space and a floor of the authentication area RA. When authentication of an authenticated person ends, for example, the display controlling part 212 may control the projecting apparatus P through the communication device 23 such that the projected image according to the authenticated person information I is projected on such as a space and a floor of the authentication area RA in accordance with a position of the authenticated person.

When authentication of an authenticated person ends, the display controlling part 212 may project a picture according to the authenticated person information I in a space in accordance with a position of the authenticated person. For example, an authenticated person may recognize that authentication is successful by projecting a picture, in which a gate opens, at a position, at which the authenticated person is when the authentication ends. Alternatively, an authenticated person may recognize that authentication is failed by projecting a picture, in which a gate maintains a close state, at a position, at which the authenticated person is when the authentication ends.

[6-3: Display Controlling Operation Performed by the Display Controlling Apparatus 6]

Figure 12:
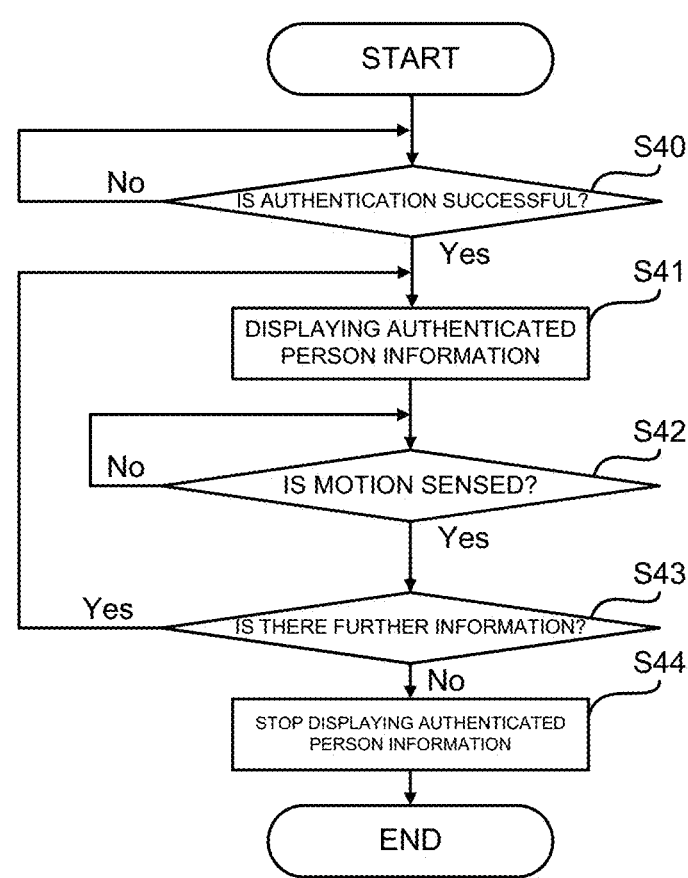
FIG. 12 is a flowchart showing flow of display controlling operation performed by the display controlling apparatus in the sixth embodiment.

Next, display controlling operation performed by the display controlling apparatus 6 in the sixth embodiment is described with referring to FIG. 12. FIG. 12 is a flowchart showing flow of the display controlling operation performed by the display controlling apparatus 6 in the sixth embodiment.

As shown in FIG. 12, the display controlling part 212 determines whether or not authentication of an authenticated person is successful (step S40). When the authentication of the authenticated person is not successful (step S40: No), return to the step S40. The display controlling part 212 repeats the process of the step S40 until the authentication of the authenticated person is successful.

When the authentication of the authenticated person is successful (step S40: Yes), the display controlling part 212 projects a projected image according to an authentication result as the authenticated person information I at feet of the authenticated person (step S41).

Moreover, the position estimating part 211 may estimate a position of the authenticated person, and the display controlling part 212 may move a position of the projected image according to the authenticated person information I. When the authenticated person moves from left to right in the figure, the display controlling part 212 may move a projected position of the projected image according to the authenticated person information I from left to right.

The motion sensing part 215 senses the authenticated person performing a predetermined motion. The display controlling part 212 determines whether or not the authenticated person performing the predetermined motion is sensed (step S42). The predetermined motion performed by the authenticated person may be such as a nodding motion, an OK pose motion and eye-gaze movement. When the authenticated person performing the predetermined motion is sensed (step S42: Yes), the display controlling part 212 stops projecting a projected image showing an authentication result as the authenticated person information I. The display controlling part 212 determines whether or not information announced to the authenticated person presents, other than the authentication result (step S43). When the information announced to the authenticated person presents (step S43: Yes), proceed to the step S41, and then the display controlling part 212 projects a projected image according to the information announced. In a case, in which the information announced to the authenticated person presents, other than the authentication result, when the predetermined motion is sensed, the display controlling part 212 may projects a projected image according to the information at feet of the authenticated person. When information announced to the authenticated person absents, the display controlling part 212 stops projecting a projected image for the authenticated person (step S44).

Moreover, the transmitting part 216 may transmit the authenticated person information I to a terminal device carried by an authenticated person at least one of a case, in which authentication of the authenticated person is ended, and a case, in which authenticated persons are no longer in the authentication area RA. The transmitting part 216 may transmit push notification to the terminal device by using the authenticated person exiting from the authentication area RA as a trigger. The terminal device may be a smartphone, a smartwatch, an AR glasses, a VR goggles, etc. In this case, the authenticated person information I may be information, which can be seen, information, which can be touch such as vibration, or information, which can be heard such as sound.

Moreover, for example, the output device 25 may output sound information, that only a person himself/herself can hear, from a directional speaker. The output device 25 may output sound indicating permitted to pass a gate such as PiPi, or sound indicating not permitted to pass the gate such as PiPiPi, to an authenticated person at least one of a case, in which authentication of the authenticated person is ended, and a case, in which authenticated persons are no longer in the authentication area RA.

[6-4: Technical Effect of the Display Controlling Apparatus 6]

The display controlling apparatus 6 in the sixth embodiment can announce success of authentication at a timing, at which authentication succeeds, thereby the display controlling apparatus 6 has excellent immediacy.

7: Supplementary Note

In regard to embodiments described above, the following supplementary notes may be further disclosed.

[Supplementary Note 1]

A display controlling apparatus comprising:

a position estimating means for estimating a position of an authenticated person from an image generated by imaging a predetermined space; and a display controlling means for controlling display of authenticated person information relating to the authenticated person, in accordance with the position of the authenticated person.

[Supplementary Note 2]

The display controlling apparatus according to the supplementary note 1, further comprising an eye-gaze estimating means for estimating a direction of an eye-gaze of the authenticated person, wherein, when the direction of the eye-gaze of the authenticated person is directed to a display for displaying the authenticated person information, the display controlling means displays the authenticated person information on the display.

[Supplementary Note 3-1]

The display controlling apparatus according to the supplementary note 1 or 2, wherein the position estimating means estimates the position of the authenticated person on the basis of at least one of a direction, in which the authenticated person is heading, and walk velocity of the authenticated person, and the display controlling means controls at least one of timing for displaying the authenticated person information and a position, in which the authenticated person information is displayed, in a display.

[Supplementary Note 3-2]

The display controlling apparatus according to the supplementary note 1 or 2, wherein the position estimating means estimates the position of the authenticated person on the basis of at least one of a direction, in which the authenticated person is heading, and walk velocity of the authenticated person, and the display controlling means controls at least one of timing for displaying the authenticated person information and a position of a display for displaying the authenticated person information.

[Supplementary Note 4]

The display controlling apparatus according to any one of supplementary notes 1 to 3, further comprising a storing means for storing the authenticated person and a destination of the authenticated person in association with each other, wherein, the display controlling means specifies a destination of the authenticated person from information stored in the storing means, and displays the authenticated person information on a display corresponding to the destination.

[Supplementary Note 5]

The display controlling apparatus according to the supplementary note 4, wherein the storing means stores the authenticated person and status of the authenticated person in accordance with each other, and stores the status and a destination according to the status in accordance with each other.

[Supplementary Note 6]

The display controlling apparatus according to any one of supplementary notes 1 to 5, further comprising a motion sensing means for sensing that the authenticated person has performed a predetermined motion, wherein, the display controlling means stops displaying the authenticated person information in sensing that the predetermined motion is performed.

[Supplementary Note 7]

The display controlling apparatus according to the supplementary note 6, wherein when there is information, which should be announced to the authenticated person, other than the authenticated person information in sensing that the predetermined motion is performed, the display controlling means controls display of the information.

[Supplementary Note 8]

The display controlling apparatus according to any one of supplementary notes 1 to 7, further comprising a transmitting means for transmitting the authenticated person information to a terminal device carried by the authenticated person at least one case of a case, in which authentication of the authenticated person is ended, and a case, in which the authenticated person is no longer presence in the predetermined space.

[Supplementary Note 9]

The display controlling apparatus according to any one of supplementary notes 1 to 8, wherein the display controlling means controls display of the authenticated person information according to the position of the authenticated person when authentication of the authenticated person is ended.

[Supplementary Note 10]

The display controlling apparatus according to any one of supplementary notes 1 to 9, wherein the display controlling means projects a picture according to the authenticated person information to a space, in accordance with the position of the authenticated person when authentication of the authenticated person is ended.

[Supplementary Note 11]

A display controlling method including:

estimating a position of an authenticated person from an image generated by imaging a predetermined space; and controlling display of authenticated person information relating to the authenticated person, in accordance with the position of the authenticated person.

[Supplementary Note 12]

A recording medium, on which a computer program is recorded, wherein the computer program makes a computer perform a display controlling method including: estimating a position of an authenticated person from an image generated by imaging a predetermined space, and controlling display of authenticated person information relating to the authenticated person, in accordance with the position of the authenticated person.

At least a part of components of each of the above-mentioned embodiments may be combined with at least another part of components of each of the above-mentioned embodiments. A part of components of each of the above-mentioned embodiments may be not used. In addition, to the extent permitted by law, the disclosures of all documents (e.g., publications) cited in this disclosure above are incorporated by reference into this disclosure.

This disclosure can appropriately be changed within limits being not contrary to summary of inventions or ideas, that can be read from the scope of claims and all of the specification, a display controlling apparatus, a display controlling method and a recording medium with such changes are also included in technical ideas of this disclosure.

EXPLANATION OF SYMBOL 1, 2, 3, 4, 5, 6 Display controlling apparatus
11, 211 Position estimating part
12, 212 Display controlling part

213 Eye-gaze estimating part
214 Storage controlling part
215 Motion sensing part
216 Transmitting part
I Authenticated person information
LA Restricted area
RA Authentication area
CA Confirmation area
D, D1, D2, D3 Display
What is claimed is:

1. A display controlling apparatus comprising:
at least one memory configured to store instructions, and
at least one processor configured to execute the instructions to:
estimate a position of an authenticated person from an image generated by imaging a predetermined space;
control display of authenticated person information relating to the authenticated person, in accordance with the position of the authenticated person;
store the authenticated person and a destination of the authenticated person in association with each other, in the at least one memory;
specify a destination of the authenticated person from information stored in the at least one memory;
specify a display corresponding to the destination among a plurality of displays installed;
estimate a direction of an eye-gaze of the authenticated person; and
when the direction of the eye-gaze of the authenticated person is directed to the display corresponding to the destination for displaying the authenticated person information, display the authenticated person information on the display.

2. The display controlling apparatus according to claim 1, wherein
the at least one processor is configured to execute the instructions to:
estimate the position of the authenticated person on the basis of at least one of a direction, in which the authenticated person is heading, and walk velocity of the authenticated person, and
control at least one of timing for displaying the authenticated person information and a position of a display for displaying the authenticated person information.

3. The display controlling apparatus according to claim 1, wherein
the at least one processor is configured to execute instructions to:
store the authenticated person and status of the authenticated person in accordance with each other, and
store the status and the destination according to the status in accordance with each other.

4. The display controlling apparatus according to claim 1, wherein the at least one processor is configured to execute instructions to:
sense means for sensing that the authenticated person has performed a predetermined motion, and
stop displaying the authenticated person information in sensing that the predetermined motion is performed.

5. The display controlling apparatus according to claim 4, wherein
when there is information, which should be announced to the authenticated person, other than the authenticated person information in sensing that the predetermined motion is performed, the at least one processor is configured to execute instructions to control display of the information.

6. The display controlling apparatus according to claim 1, wherein the at least one processor is configured to execute instructions to transmit means for transmitting the authenticated person information to a terminal device carried by the authenticated person at least one case of a case, in which authentication of the authenticated person is ended, and a case, in which the authenticated person is no longer presence in the predetermined space.

7. The display controlling apparatus according to claim 1, wherein
the at least one processor is configured to execute instructions to control display of the authenticated person information according to the position of the authenticated person when authentication of the authenticated person is ended.

8. The display controlling apparatus according to claim 1, wherein
the at least one processor is configured to execute instructions to project a picture according to the authenticated person information to a space, in accordance with the position of the authenticated person when authentication of the authenticated person is ended.

9. A display controlling method including:
estimating a position of an authenticated person from an image generated by imaging a predetermined space;
controlling display of authenticated person information relating to the authenticated person, in accordance with the position of the authenticated person;
storing the authenticated person and a destination of the authenticated person in association with each other, in at least one memory;
specifying a destination of the authenticated person from information stored in the at least one memory;
specifying a display corresponding to the destination among a plurality of displays installed;
estimating a direction of an eye-gaze of the authenticated person; and
when the direction of an eye-gaze of the authenticated person is directed to the display corresponding to the destination for displaying the authenticated person information, displaying the authenticated person information on the display.

10. A non-transitory recording medium, on which a computer program is recorded, wherein the computer program makes a computer perform a display controlling method including:
estimating a position of an authenticated person from an image generated by imaging a predetermined space;
controlling display of authenticated person information relating to the authenticated person, in accordance with the position of the authenticated person;
storing the authenticated person and a destination of the authenticated person in association with each other, in memory;
specifying a destination of the authenticated person from information stored in the memory;
specifying a display corresponding to the destination among a plurality of displays installed;
estimating an eye-gaze of the authenticated person; and
when the direction of the eye-gaze of the authenticated person is directed to the display corresponding to the destination for displaying the authenticated person information, displaying the authenticated person information on the display.

11. The display controlling apparatus according to claim 2, wherein the at least one processor is configured to execute the instructions to:

store the authenticated person and the destination of the authenticated person in association with each other, specify the destination of the authenticated person from information stored in the storing means, and display the authenticated person information on the display corresponding to the destination.

12. The display controlling apparatus according to claim 11, wherein the at least one processor is configured to execute instructions to:

store the authenticated person and status of the authenticated person in accordance with each other, and store the status and a destination according to the status in accordance with each other.

13. The display controlling apparatus according to claim 2, wherein the at least one processor is configured to execute instructions to:

sense that the authenticated person has performed a predetermined motion, and stop displaying the authenticated person information in sensing that the predetermined motion is performed.

14. The display controlling apparatus according to claim 13, wherein when there is information, which should be announced to the authenticated person, other than the authenticated person information in sensing that the predetermined motion is performed, the at least one processor is configured to execute instructions to control display of the information.

15. The display controlling apparatus according to claim 1, wherein the at least one processor is configured to execute instructions to:

sense that the authenticated person has performed a predetermined motion, and stop displaying the authenticated person information in sensing that the predetermined motion is performed.

16. The display controlling apparatus according to claim 15, wherein when there is information, which should be announced to the authenticated person, other than the authenticated person information in sensing that the predetermined motion is performed, the at least one processor is configured to execute instructions to control display of the information.

17. The display controlling apparatus according to claim 3, wherein the at least one processor is configured to execute instructions to:

sense that the authenticated person has performed a predetermined motion, and stop displaying the authenticated person information in sensing that the predetermined motion is performed.

18. The display controlling apparatus according to claim 17, wherein when there is information, which should be announced to the authenticated person, other than the authenticated person information in sensing that the predetermined motion is performed, the at least one processor is configured to execute instructions to control display of the information.

19. The display controlling apparatus according to claim 2, wherein the at least one processor is configured to execute instructions to transmit the authenticated person information to a terminal device carried by the authenticated person at least one case of a case, in which authentication of the authenticated person is ended, and a case, in which the authenticated person is no longer presence in the predetermined space.

20. The display controlling apparatus according to claim 1, wherein the plurality of displays are installed at positions corresponding to the destination.

\* \* \* \* \*